UNITED STATES PATENT OFFICE 2,440,140

ADDITION PRODUCTS OF ACRYLONITRILE AND DRYING OIL ACIDS AND ESTERS

Herman A. Bruson, Rydal, and Warren D. Niederhauser, Philadelphia, Pa., assignors to The Resinous Products & Chemical Company, Philadelphia, Pa., a corporation of Delaware No Drawing. Application June 21, 1945, Serial No. 600,850

16 Claims. (Cl. 260—404)

1

This invention relates to addition products of acrylonitrile and drying oil acids or their esters.

It has heretofore been proposed to polymerize acrylic acid derivatives with drying oils. The products thus obtained are resinous copolymers of very large molecular weight.

In contrast thereto, the products of this invention are not polymers or resins but cyano-carboxylic acids or cyano-esters of definite composition. The products in general are oils or liquids which can be distilled at low pressures except for the higher esters or esters of polyhydric alcohols of high molecular weight.

The products are useful in the form of esters as plasticizers. They are also valuable intermediates for the preparation of dicarboxylic acids upon hydrolysis and can be reduced to aminocarboxylic acids and aminoalcohols, derivatives which are of value in the manufacture of plastics.

The products of this invention are obtained by reacting by addition at about 80° C. to about 300° C. acrylonitrile and a long-chained fatty acid, or an ester thereof, in which there are present two olefinic linkages in conjugate relationship. The addition is effected in the absence of any polymerizing catalyst, and advantageously in the presence of an inhibitor for polymerization and/or under an inert atmosphere, for example, nitrogen or carbon dioxide.

Typical fatty acids possessing at least two olefinic linkages, of which a pair is in conjugate relationship, are α-elaeo-stearic acid, β-elaeostearic acid, α-licanic acid, β-licanic acid, and 9,11-octadecadienic acid. Technical mixtures of such acids resulting from hydrolysis of tung oil or oiticica oil may be used. There may also be used the dehydration products of castor oil fatty acids or the acids containing conjugated double bonds formed by alkaline rearrangement of various unsaturated fatty acids and esters.

In place of the free fatty acids, there may be reacted the esters formed from these acids and alcohols, both monohydric and polyhydric. One important class of esters is formed from such monohydric alcohols as methyl, ethyl, isopropyl, butyl, isobutyl, amyl, hexyl, octyl, dodecyl, cetyl, cyclohexyl, benzyl, chloroethyl, phenoxyethyl, tert.-butylphenoxyethyl, tetrahydrofurfuryl, and the like. There may also be used the phenyl esters. The esters of the lower alcohols yield cyano-esters which are readily distillable at reduced pressures. Some of the higher alcohols yield waxy products. There may likewise be used esters of polyhydric alcohols such as glycols, glycerine, pentaerythritol, sorbitol, etc., and the conjugated

2 fatty acids. In the addition of acrylonitrile to these rather complex esters, it is preferable to effect the reaction in the presence of a small amount of an inhibitor such as hydroquinone, pyrogallol, naphthylamine, α-naphthol, diphenylamine, or the like.

The following examples, illustrative of the preparation of various addition products, present details of advantageous procedures which may be used for the purposes of this invention. Parts indicated are by weight.

*Example 1*

A mixture of 167 parts of tung oil fatty acids and 48 parts of acrylonitrile was heated under reflux at 90°–130° C. for forty-eight hours. The product was distilled to give 146 parts (73% yield) of addition product having a boiling range of 240°–255° C./3 mm., a refractive index, $n_D^{20}$, of 1.4929, and a density, $d_4^{20}$, of 0.9632. From analytical data (nitrogen, 4.61%, and iodine number of 133, as compared to the calculated values for $C_{21}H_{33}O_2N$ of 4.23% nitrogen and 153.5 iodine number), it is evident that the primary product is that formed by addition of one mol of fatty acid and one mol of acrylonitrile.

*Example 2*

A mixture of 41.7 parts of β-elaeostearic acid, 10.6 parts of acrylonitrile, and 0.2 part of hydroquinone was heated under reflux for fifteen hours, the temperature of the reaction mixture slowly rising from 90° to 150° C. The product was distilled to give 34 parts (69% yield) of pale-yellow oil having a boiling range of 255°–265° C./5 mm., a refractive index, $n_D^{20}$, of 1.4905, and a density, $d_4^{20}$, of 0.9774. From analytical data (nitrogen, 4.05%; iodine number, 128; and acid number, 160, as compared to the calculated values for $C_{21}H_{33}O_2N$ of: iodine number, 153.5; acid number, 170; and nitrogen, 4.23%), it is evident that the primary product is that formed by addition of one mol of fatty acid and one mol of acrylonitrile.

*Example 3*

A mixture of 24 parts of β-licanic acid, 12 parts of acrylonitrile, and 0.2 part of hydroquinone was heated under reflux for forty hours at 90°–112° C. The product was distilled to give 9.5 parts of an addition product having a boiling range of 260°–265° C./1 mm., a refractive index, $n_D 25$, of 1.5008.

Example 4

A mixture of 83.4 parts of octadecadienic acid, prepared by the dehydration of castor oil fatty acids, 32 parts of acrylonitrile, and 0.2 part of pyrogallol was heated in an autoclave for fourteen hours at 180° C. The reaction mixture was distilled to give 28 parts of adduct, having a boiling range of 250°–260° C./4 mm., a density, $d_4^{20}$, of 0.9575, and a refractive index, $n_D^{20}$, of 1.48.

Example 5

A mixture of 83.4 parts of linseed oil fatty acids which had been isomerized to a conjugate system by being heated with alkali (available under the trade name of "Conjulin"), 24 parts of acrylonitrile, and 0.2 part of pyrogallol was heated under reflux for forty-eight hours at 90°–150° C. The product was distilled to give 30.5 parts of adduct, having a boiling range of 245°–260° C./4 mm., a refractive index, $n_D^{20}$, of 1.4935, and a density, $d_4^{20}$, of 0.9772. The product contained 3.4% of nitrogen and had an acid number of 181.

Example 6

A mixture of 43.8 parts of methyl elaeostearate and 13.2 parts of acrylonitrile was heated under reflux for twenty hours at 90°–160° C. The product was distilled to give 26.5 parts of light yellow oil, boiling at 225°–230° C./2 mm., having a refractive index, $n_D^{20}$, of 1.4833 and a density, $d_4^{20}$, of 0.9507. The analytical data (nitrogen, 3.67%, and iodine number, 125) show this distillate to be chiefly the addition product of one mol of ester and one mol of acrylonitrile.

Example 7

A mixture of 34.5 parts of methyl licanate, 15 parts of acrylonitrile, and 0.1 part of hydroquinone was heated under reflux for forty-five hours at 85°–95° C. Upon distillation, the product was collected at 235°–245° C./1 mm. It had a refractive index, $n_D^{20}$, of 1.4927. From the nitrogen analysis of 3.57%, it appears that most of the distillate is the addition product of one mol of ester and one of acrylonitrile.

Example 8

A mixture of 88 parts of methyl octadecadienate, 24 parts of acrylonitrile, and 0.2 part of hydroquinone was heated in an autoclave for thirteen hours at 250° C. The product was distilled to give 38 parts of a light yellow oil boiling at 235°–245° C./6 mm. and having a density, $d_4^{20}$, of 0.9424 and a refractive index, $n_D^{20}$, of 1.4757. From the analytical data (nitrogen, 3.76%, and iodine number, 84, as compared to the calculated values for $C_{22}H_{37}O_2N$ of 4.03% nitrogen and iodine number, 73), it is evident that the distillate is chiefly the addition product of one mol of ester and one mol of acrylonitrile.

In place of the above methyl esters, there may be used any other ester, the product in each case being composed primarily of the adduct of one mol of acrylonitrile per unit of fatty acid in the ester.

Example 9

A mixture of 291 parts of tung oil, 53 parts of acrylonitrile, and 1 part of hydroquinone was heated under reflux for forty hours. The resulting adduct was dissolved in 1,100 parts of n-butanol to give a clear yellow solution. To it there was added a solution of 265 parts of sodium hydroxide in 140 parts of water. The mixture was heated and stirred under reflux at 115° C. for three hours. The product was acidified to Congo red with concentrated hydrochloric acid, washed with hot water, and the solvent removed on the steam bath under reduced pressure to give 364 parts of crude isomeric dicarboxylic acids. One of the isomers which was separated by recrystallization, first from nitroethane and then from butanol, melted at 110° C.

We claim:

1. Monomeric products formed by the addition at 80° C. to 300° C. of equimolecular proportions of (a) acrylonitrile and (b) a compound from the class consisting of drying oil fatty acids having conjugate olefinic bonds and esters of said acids and alcohols having the alcoholic hydroxyl group as the sole reactive functional group thereof.

2. Monomeric products formed by the addition at 80° C. to 300° C. of equimolecular proportions of (a) acrylonitrile and (b) a drying oil fatty acid having conjugate olefinic bonds.

3. Monomeric products formed by the addition at 80° C. to 300° C. of equimolecular proportions of (a) acrylonitrile and (b) esters of drying oil fatty acids having conjugate olefinic bonds and alcohols having the alcoholic hydroxyl group as the sole reactive functional group thereof.

4. Monomeric products formed by the addition at 80° C. to 300° C. of equimolecular proportions of (a) acrylonitrile and (b) esters of drying oil fatty acids having conjugate olefinic bonds and saturated monohydric aliphatic alcohols of not over four carbon atoms.

5. Monomeric products formed by the addition at 80° C. to 300° C. of equimolecular proportions of (a) acrylonitrile and (b) esters of elaeostearic acid and alcohols having the alcoholic hydroxyl group as the sole reactive functional group thereof.

6. Monomeric products formed by the addition at 80° C. to 300° C. of equimolecular proportions of (a) acrylonitrile and (b) esters of octadecadienic acid and alcohols having the alcoholic hydroxyl group as the sole reactive functional group thereof.

7. A monomeric product formed by addition at 80° C. to 300° C. of equimolecular proportions of (a) acrylonitrile and (b) methyl elaeostearate.

8. A monomeric product formed by addition at 80° C. to 300° C. of equimolecular proportions of (a) acrylonitrile and (b) methyl octadecadienate.

9. A monomeric product formed by addition at 80° C. to 300° C. of equimolecular proportions of (a) acrylonitrile and (b) octadecadienic acid.

10. A method of preparing new monomeric products which comprises reacting by addition between 80° C. and 300° C. equimolecular proportions of acrylonitrile and of a compound from the class consisting of drying oil fatty acids having conjugate olefinic bonds and esters of said acids and alcohols having the alcoholic hydroxyl group as the sole reactive functional group thereof.

11. A method of preparing new monomeric products which comprises reacting by addition between 80° C. and 300° C. in the presence of a polymerization inhibitor equimolecular proportions of acrylonitrile and a drying oil fatty acid having conjugate olefinic bonds.

12. A method of preparing new monomeric products which comprises reacting by addition between 8° C. and 300° C. in the presence of a polymerization inhibitor equimolecular proportions of acrylonitrile and of esters of drying oil fatty acids having conjugate olefinic bonds and saturated monohydric aliphatic alcohols of not over four carbon atoms.

13. A method of preparing new monomeric products which comprises reacting by addition between 80° C. and 300° C. under an inert atmosphere equimolecular proportions of acrylonitrile and of esters of drying oil fatty acids having conjugate olefinic bonds and saturated monohydric aliphatic alcohols of not over four carbon atoms.

14. A method of preparing new monomeric products which comprises reacting by addition between 80° C. and 300° C. under an inert atmosphere equimolecular proportions of acrylonitrile and of esters of elaeostearic acid and a saturated monohydric aliphatic alcohol of not over four carbon atoms.

15. A method of preparing new monomeric products which comprises reacting by addition between 80° C. and 300° C. under an inert atmosphere equimolecular proportions of acrylonitrile and of esters of octadecadienic acid and saturated monohydric aliphatic alcohols of not over four carbon atoms.

16. A method of preparing a new monomeric product which comprises reacting by addition between 80° C. and 300° C. under an inert atmosphere equimolecular proportions of acrylonitrile and of octadecadienic acid.

HERMAN A. BRUSON.
WARREN D. NIEDERHAUSER.

REFERENCES CITED

The following references are of record in the file of this patent:

UNITED STATES PATENTS

| Number | Name | Date |
| --- | --- | --- |
| 2,217,632 | Wolfe | Oct. 8, 1940 |
| 2,375,937 | Miller et al. | May 15, 1945 |
| 2,382,803 | Miller et al. | Aug. 14, 1945 |

Certificate of Correction

Patent No. 2,440,140.　　　　　　　　　　　　　　　　　April 20, 1948.

HERMAN A. BRUSON ET AL.

It is hereby certified that errors appear in the printed specification of the above numbered patent requiring correction as follows: Column 3, line 11, for "1.48" read *1.4853*; column 4, line 74, claim 12, for "8° C." read *80° C.*; and that the said Letters Patent should be read with these corrections therein that the same may conform to the record of the case in the Patent Office.

Signed and sealed this 20th day of July, A. D. 1948.

[SEAL]

THOMAS F. MURPHY,
*Assistant Commissioner of Patents.* tions of acrylonitrile and of esters of drying oil fatty acids having conjugate olefinic bonds and saturated monohydric aliphatic alcohols of not over four carbon atoms.

13. A method of preparing new monomeric products which comprises reacting by addition between 80° C. and 300° C. under an inert atmosphere equimolecular proportions of acrylonitrile and of esters of drying oil fatty acids having conjugate olefinic bonds and saturated monohydric aliphatic alcohols of not over four carbon atoms.

14. A method of preparing new monomeric products which comprises reacting by addition between 80° C. and 300° C. under an inert atmosphere equimolecular proportions of acrylonitrile and of esters of elaeostearic acid and a saturated monohydric aliphatic alcohol of not over four carbon atoms.

15. A method of preparing new monomeric products which comprises reacting by addition between 80° C. and 300° C. under an inert atmosphere equimolecular proportions of acrylonitrile and of esters of octadecadienic acid and saturated monohydric aliphatic alcohols of not over four carbon atoms.

16. A method of preparing a new monomeric product which comprises reacting by addition between 80° C. and 300° C. under an inert atmosphere equimolecular proportions of acrylonitrile and of octadecadienic acid.

HERMAN A. BRUSON.
WARREN D. NIEDERHAUSER.

REFERENCES CITED

The following references are of record in the file of this patent:

UNITED STATES PATENTS

| Number | Name | Date |
|---|---|---|
| 2,217,632 | Wolfe | Oct. 8, 1940 |
| 2,375,937 | Miller et al. | May 15, 1945 |
| 2,382,803 | Miller et al. | Aug. 14, 1945 |

---

Certificate of Correction

Patent No. 2,440,140.  April 20, 1948.

HERMAN A. BRUSON ET AL.

It is hereby certified that errors appear in the printed specification of the above numbered patent requiring correction as follows: Column 3, line 11, for "1.48" read *1.4853*; column 4, line 74, claim 12, for "8° C." read *80° C.*; and that the said Letters Patent should be read with these corrections therein that the same may conform to the record of the case in the Patent Office.

Signed and sealed this 20th day of July, A. D. 1948.

[SEAL]

THOMAS F. MURPHY,
*Assistant Commissioner of Patents.*